R. MANY.
FIRE HOSE.
APPLICATION FILED FEB. 1, 1915.
1,220,661.
Patented Mar. 27, 1917.
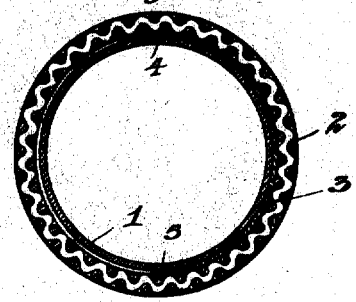
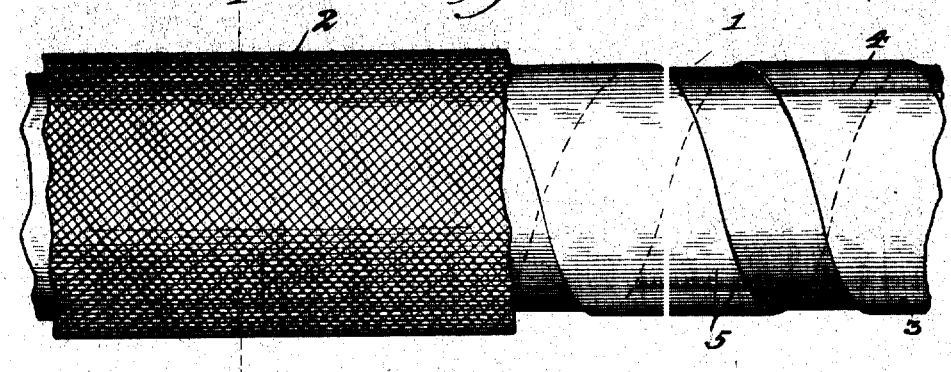
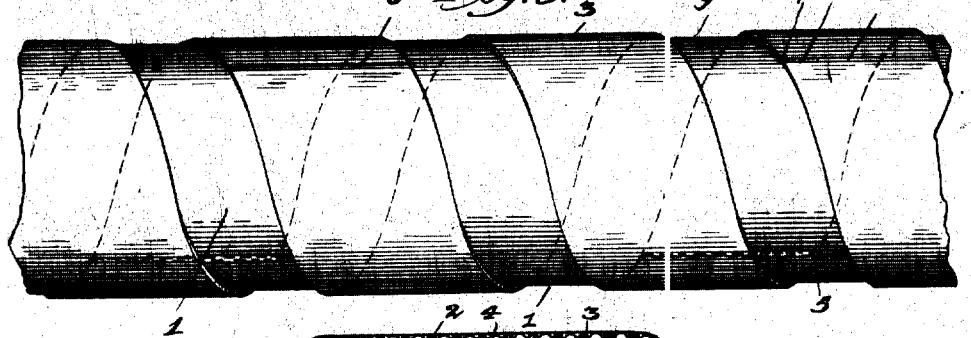
Witnesses
Inventor
Robert Many
By Frank L. Belknap

UNITED STATES PATENT OFFICE.

ROBERT MANY, OF OAK PARK, ILLINOIS.

FIRE-HOSE.

1,220,661. Specification of Letters Patent. Patented Mar. 27, 1917.

Application filed February 1, 1915. Serial No. 5,410.

*To all whom it may concern:*

Be it known that I, ROBERT MANY, a citizen of the United States, residing in the village of Oak Park, county of Cook, and State of Illinois, have invented certain new and useful Improvements in Fire-Hose, of which the following is a specification.

My invention relates to hose, and more particularly to an improved construction of fire and mill hose of larger sizes, which are usually flat when empty.

Among the salient objects of the invention are to provide an improved rubber lining in hose of this kind whereby the pinching of the lining along the lateral creases of the hose, when empty, is largely prevented; to provide a construction in which the rubber lining can be withdrawn for the purpose of replacing or repairing either the lining or the cotton jacket, thus materially adding to the life of the hose; to provide a construction in which a relatively non-elastic fabric is so arranged that it will allow for the elongation of the lining under pressure and at the same time prevent the lining from tearing; to provide a construction in which the reinforcing fabric is arranged to allow for expansion of the lining under pressure, but will cause the lining to return to its original flat position when the pressure is removed; to provide a construction in which the reinforcing fabric prevents the rubber lining from coming into contact, either when empty or under pressure, with the rough interior surface of the cotton jacket, thus causing the bore of the rubber lining to remain smooth and doing away with the greatest amount of friction; to provide a construction in which the rubber lining has longitudinal movement independent of the incasing jacket and in which the lining is not under strain when in storage; to provide a construction in which the reinforcement for the rubber lining comprises a plurality of fabric bands, the fabric preferably being wound around the rubber lining and severed to divide it into a plurality of independent bands; to so construct and arrange the reinforcing fabric that the free ends of the various bands will not register in longitudinal alinement with the ends of the adjacent bands; to provide a construction in which there is no rubber cement nor plastic filling used, the lining not being attached to the cotton jacket at any portion of a section of the hose, as is the case in the usual construction of hose of this size. Another object of the invention is to reduce the cost of manufacture and in general to provide an improved hose of the character referred to.

In the drawings—

Figure 1 is a cross section taken on the line 1—1 of Fig. 2.

Fig. 2 is a side elevation showing part of the incasing jacket.

Fig. 3 is a side elevation showing the arrangement of the reinforcing fabric of the rubber lining, and Fig. 4 is a cross-section showing the hose in its normal flat position.

Referring in detail to the particular embodiment of my invention shown in the drawings, 1 designates the rubber lining, and 2 designates the outer casing or cotton jacket, which surrounds the rubber lining. This outer casing is formed of a woven fabric, and is constructed to lie flat when not in use, and my invention contemplates an improved construction of reinforced rubber lining, which can be detachably employed in combination with a cotton jacket.

In previous constructions of hose of this type the rubber lining or at least a portion of it was fixedly attached to the outer casing. This permanent connection between the elastic lining and the relatively non-elastic casing not only interfered with the expansion of the lining, but in case of injury it was impossible to renew or repair the parts separately. However, in hose construction embodying my invention, the rubber lining is not only separate from the cotton jacket, but it is reinforced in a manner which will both protect it from rubbing against the rough interior surface of the jacket and at the same time allow of the necessary expansion and independent movement.

As shown in Figs. 2 and 3, the reinforcing fabric member 3 is wound spirally around the rubber lining 1, and at circumferentially disposed portions the member 3 is severed. This divides the fabric 3 into a plurality of spiral bands having their free ends 7 and 8 adjacent but entirely unattached from each other. Attention is particularly called to the fact that the various meeting edges 7 and 8 are arranged in staggered relation so that there is no longitudinal portion of the rubber lining that does not have reinforcement in particular points of the hose, and at the same time provides a means for permitting the expansion of the lining as it fills up.

In winding the reinforcing fabric member 3 spirally around the lining 1, there are preferably left intermediate portions 9 of the lining, which are not covered by the reinforcing member. This construction, together with the arrangement for relative movement between the free ends 7 and 8, provides for the necessary expansion of the rubber both in a longitudinal and lateral direction. While I preferably adhesively attach the reinforcing fabric to the rubber lining, when the lining is not inflated and then sever the fabric to produce the free ends 7 and 8, it is obvious that the reinforcing fabric member 3 may be severed first or at the time of its attachment to the lining 1.

The rubber lining of a hose constructed as above described will lie flat within the cotton jacket without danger of pinching the edge portions or placing any undue strain upon any portion of the lining. The fabric member 3 serves both as a reinforcing member and as a guard for holding the lining out of contact with the rough interior of the jacket. However, a lining reinforced in this manner will, when emptied, immediately return to its normal flat position within the jacket, and in folding the hose on a wagon or packing the same on racks, there is no crease along the lateral sides or at the folds.

While I have shown and described a particular arrangement of parts for reinforcing the rubber lining, which is not secured to the cotton jacket, and for returning it, when empty, to its normal flat position, it is obvious that various other constructions could be employed within the scope of my invention for securing the advantages enumerated. By having the rubber lining and cotton jacket separate, the lining is not under strain when in storage, and it has at all times independent longitudinal movement relative to the cotton jacket, which incases it. Also, while my construction is particularly applicable for hose of large sizes, such as fire or mill hose, it is not confined to such use, and I do not desire to limit the invention except as specified in the appended claims.

I claim as my invention:

1. In a hose construction, the combination with an inclosing casing for limiting the expansion of an inner fluid conveying tube and for protecting the same, of an inner fluid conveying tube adapted to be slipped into the casing and held therein unattached throughout the major portion of its length and through its circumference, said casing and tube being designed when out of use to assume a collapsed flattened condition folded along diametrically opposed lengthwise lines and said tube having fixedly secured to the outer surface thereof spaced apart fabric strips for protecting and reinforcing the folded edges of the inner tube, said strips being spaced apart for providing for the expansion of the tube circumferentially.

2. In a hose construction, the combination with an inclosing casing for limiting the expansion of an inner fluid conveying tube and for protecting the same, of an inner fluid conveying tube adapted to be slipped into the casing and held therein unattached throughout the major portion of its length and through its circumference, said casing and tube being designed when out of use to assume a collapsed flattened condition folded along diametrically opposed lengthwise lines and said tube having fixedly secured to the outer surface thereof fabric strips for protecting and reinforcing the folded edges of the inner tube, said strips having edges extending lengthwise of the tube spaced apart for providing uncovered portions extending lengthwise of the tube.

ROBERT MANY.

Witnesses:
F. L. BELKNAP,
JOYCE M. LUTZ.